Figure 1:
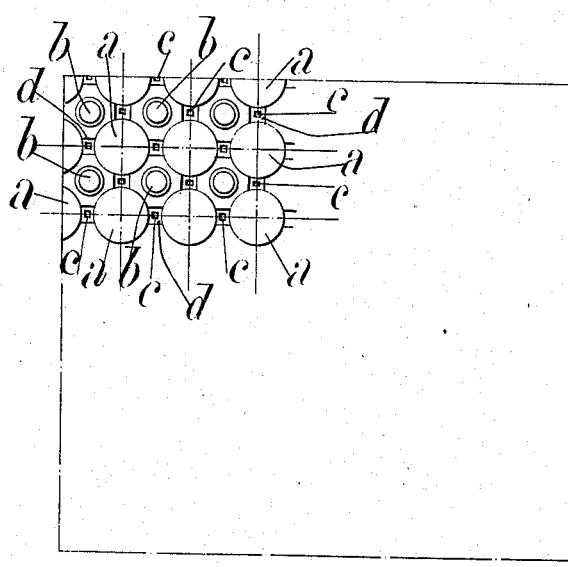

M. C. THIELLET & M. J. DENARD.
ELECTRIC ACCUMULATOR.
APPLICATION FILED APR. 3, 1907.

900,898. Patented Oct. 13, 1908.

WITNESSES

INVENTORS
Molies Charles Thiellet
Marius Joseph Denard

UNITED STATES PATENT OFFICE.

MOLIÈRE CHARLES THIELLET AND MARIUS JOSEPH DENARD, OF LYON, FRANCE.

ELECTRIC ACCUMULATOR.

No. 900,898.　　　　　Specification of Letters Patent.　　　Patented Oct. 13, 1908.

Application filed April 3, 1907. Serial No. 366,240.

*To all whom it may concern:*

Be it known that we, MOLIÈRE CHARLES THIELLET and MARIUS JOSEPH DENARD, citizens of the French Republic, residing at Lyon, in France, have invented a certain new and useful Electric Accumulator, of which the following is a specification.

This invention relates to improvements in electric accumulators and its purpose is to increase the life and efficiency of such accumulators. This object is attained by securing more perfect adherence and conductive connection between the active mass and the carriers thereof, by rendering the said mass harder and less liable to disintegration, by securing more complete and uniform chemical action in order to prevent distortion of the plates, and by facilitating the circulation of the electrolyte and the escape of the gases evolved.

The active mass used at the negative electrodes of the improved accumulator is a mixture of lead oxid, minium, sulfate of magnesium and gelatinous bichromated silicate, good results being obtained by using 80 parts lead oxid, 10 parts minium, 10 parts sulfate of magnesium, with gelatinous bichromated silicate added to form a paste.

The active mass used at the positive electrodes is a mixture of lead oxid, chemically produced peroxid of lead, sulfate of magnesium, granular pumice stone, and gelatinous bichromated silicate, good results being obtained by using 80 parts peroxid of lead, 10 parts lead oxid, 5 parts pumice stone, 5 parts sulfate of magnesium, with gelatinous bichromated silicate added to form a paste. The proportions here indicated for the constituents of the negative and positive masses may, however, be varied within certain limits not exceeding, in general, an increase or decrease of ten per cent.

The cementitious substance referred to as gelatinous bichromated silicate, which is insoluble in dilute and concentrated sulfuric acid, is used to render the active mass hard and adhesive and is prepared in the following manner.

Asbestos board or cord is boiled for approximately two hours in dilute sulfuric acid of density 1.10, and is by this means disintegrated and converted into a paste or emulsion of asbestos fiber, which is filtered and washed to remove all traces of acid. 250 grams of this fibrous asbestos are then mixed with 9 liters of sulfuric acid of density 1.22, the mixture being stirred to render it homogeneous, with the addition of 2 liters of silicate of soda of density 1.20. Before the silicate of soda is added it is freed from chlorin by the following process. Equal quantities of silicate of soda and distilled water are mixed in an iron vessel, and a porous pot containing equal quantities of silicate of soda and caustic potash (of density 1.22 to 1.25) is placed therein, the liquids in the outer and inner vessel being at the same level and an iron plate being placed in the porous pot to act as an anode, with the outer vessel acting as a cathode. Electric current is then caused to flow through this cell, and the action thereof causes the chlorin to pass into the anode-chamber, in which it is absorbed by the caustic soda.

The mixture of 250 grams asbestos fiber, 9 liters sulfuric acid, 2 liters silicate of soda, is agitated until it becomes as fluid as possible and acquires an oily appearance. To this mixture are added 60 or 70 per cent. of bichromated gelatin prepared by mixing 120 grams gelatin, 1440 grams water, 24 grams bichromate of potash, 10 cubic centimeters of ammonia. The gelatin is caused to absorb water at a temperature of 60 degrees centigrade, and this water is then pressed out and replaced by fresh water at the same temperature, which is then also pressed out, and the same operations are repeated a third time, the purpose being to remove from the gelatin impurities, for example fatty admixtures. The quantity of water which may be used for this purpose is, of course, not restricted to any definite proportion. The water to be mixed with the gelatin is poured over the latter while the gelatin is still wet, and the water and gelatin are then placed over a Bunsen burner and raised to a temperature of 80° centigrade, at which the gelatin is dissolved. When the solution is clear, without solid nuclei therein, the bichromate of potash is added thereto in a finely pulverized state. Thereupon the mixture is filtered and the ammonia is added.

The paste must be prepared immediately after the preparation of the gelatinous mixture, since the latter rapidly becomes hard. A mixture of gelatinous mass and active mass, dried and exposed to the sun for an hour, forms at the end of twenty-four hours a stiff paste, which is insoluble in hot and cold water and in dilute and concentrated sulfuric acid. This paste is powerfully pressed in molds of special construction which will be described hereinafter. The cementation obtained by means of the gelatinous mixture produces perfect cohesion of the particles. The plates are dried in a dark place at a constant temperature of 18 degrees centigrade, and are then exposed to the sun-light for a period depending on the degree of durability which it is desired to secure. It has been found that exposure for 80 minutes produces a sufficient degree of durability without deteriorating the capacity in ampere-hours. By increasing the proportion of potassium bichromate the hardness of the mixture is increased, but the capacity is at the same time reduced. For the positive electrodes pure peroxid of lead is more suitable than any other oxid of lead.

In order that the formation may take place under favorable conditions it is essential that the paste has sufficient conductivity, and this is nearly always the case. If, however, a too large proportion of dioxid of lead is used, for example more than 90 per cent., the conductivity may be too low, and the formation only takes place progressively from the conductor towards the center of the mass, more particularly if the pockets in the plates are large. The rate of formation is in that case low, the greater part of the current being used to electrolyze the sulfuric acid, and the adhesion of the peroxid is not very perfect. To obviate this disadvantage a paste containing peroxid of lead is used. The formation in that case goes to a greater depth, and the length of time required therefor is considerably reduced.

The active mass is compressed in a mold which imparts to it the shape of an embossed plate, one side of which is shown in Figure 1. The two sides of the plate are identical, but the arrangement of the circular bosses $a$ and $b$ is such that the bosses $a$ on either side are coaxial with the bosses $b$ of smaller diameter on the other side. The plate is provided with small holes $c$ made at the bases of rectangular recesses $d$. The longer sides of the recesses $d$ on one side of the plate are perpendicular to the longer sides of the recesses $d$ on the other side of the plate.

Figure 2:
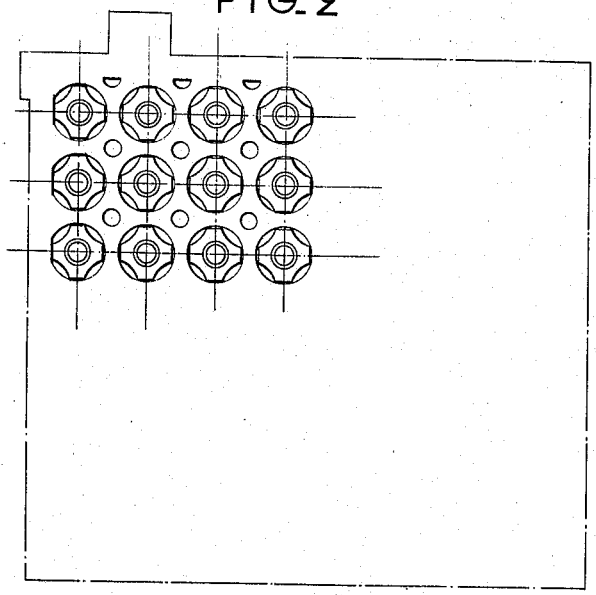

The metallic support or carrier of the active mass is cast on the plate, so that molten metal flows through the holes $c$ and forms as it were tenons which connect the two parts of the carrier. Fig. 2 shows the carrier, with the active mass removed.

For casting the carrier the plate of active mass is placed in a mold consisting of two symmetrical parts. The casting is performed at a high temperature so that subsequently the metal contracts considerably and is thus pressed tightly against the active mass. Homogeneousness is secured by introducing compressed air, by which the metal is forced into the small cavities and recesses.

Figure 3:
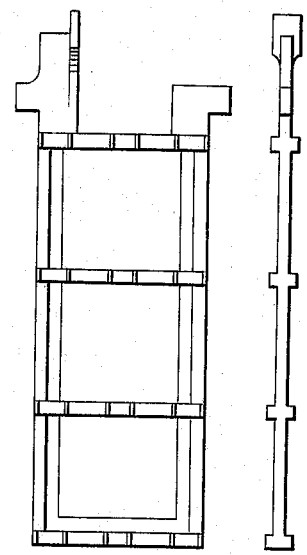

An indefinite number of electrodes thus produced may be joined up together, according to the capacity of the battery to be produced. For large batteries or portable batteries the electrodes may be soldered or sealed into frames of the same metal or metallic composition as the carrier. Fig. 3 represents a frame for three electrode plates.

The carrier consists of an alloy, the ingredients of which are as follows:—lead 83 per cent., antimony 7 per cent., zinc 10 per cent., subject, however, to variations in the proportions of the constituents. The percentage of lead may vary between 80 and 90, that of antimony between 5 and 10, and that of zinc between 8 and 15. The hardness, lightness and porosity of the carrier depend on the choice of these proportions. The specific proportions indicated give good results for average requirements.

From the positive plates the zinc must be eliminated. This is effected in the following manner. The plates are placed in a receptacle containing sulfuric acid 12 grams, water 88 grams. Into this receptacle is placed a porous pot containing a carbon plate and nitric acid at 30 or 40 degrees Baumé, the purpose of the latter being to act as a depolarizer. The composite plates are then connected to the carbon plate, whereupon the zinc is dissolved in the sulfuric acid; the hydrogen evolved by the decomposition of the water reduces the nitric acid, water and nitric peroxid being formed. By the elimination of the zinc the carrier is rendered porous, which is an advantage, the weight being reduced and the surface for contact with the electrolyte being increased. At the same time the sulfate of magnesium in the active mass is disintegrated and removed, so that the active mass becomes porous.

In the case of the negative electrodes the presence of the zinc is an advantage and has been found to increase the electromotive force 0.5 volt.

At the beginning of the discharge curve there is a sharp drop from 2.8 volts to 2.5 volts; thereupon the e. m. f. becomes constant and remains during normal discharge at between 2.4 and 2.3 volts. From this value the e. m. f. does not drop suddenly to zero, but remains for a very considerable time between 0.6 and 0.4 volts. The drop from 0.6 volt to zero occupies a longer period than the drop from the normal e. m. f. (2.4 or 2.3 volts) to 0.6 volt, and the slope of the curve is steep at the end. The maintenance of the electromotive force at a value varying from 0.6 to 0.4 volt is explained by the following reactions:—

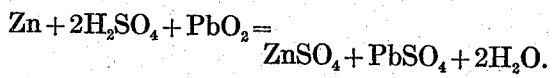

$$Zn + 2H_2SO_4 + PbO_2 = ZnSO_4 + PbSO_4 + 2H_2O.$$

At the end of this discharge the normal action of the positive electrode ceases, but if there is still an excess of zinc present a new couple comes into action, the lead sulfate becoming the positive electrode and producing with the zinc an electromotive force of approximately 0.5 volt, the reaction being as follows:—

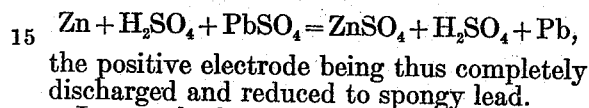

$$Zn + H_2SO_4 + PbSO_4 = ZnSO_4 + H_2SO_4 + Pb,$$

the positive electrode being thus completely discharged and reduced to spongy lead.

It may also be mentioned that owing to the presence of zinc in the negative electrodes the specific capacity is increased, the electrochemical equivalent of zinc being smaller than that of lead. Moreover, the presence of zinc renders the sulfating of the plates impossible.

What we claim as our invention and desire to secure by Letters Patent of the United States is:—

In an electric accumulator an electrode comprising in combination with the oxid of lead, gelatin gelatinized in aqueous bichromate of potash, and asbestos fiber emulsified in sulfuric acid and silicate of soda.

In witness whereof we have signed this specification in the presence of two witnesses.

MOLIÈRE CHARLES THIELLET.
MARIUS JOSEPH DENARD.

Witnesses:
 GASTON ZEAUNIAUX,
 THOS. N. BROWNE.